(12) United States Patent
Lanciaux (10) Patent No.: US 11,614,254 B2
(45) Date of Patent: Mar. 28, 2023

(54) INSULATED METAL CLAD REINFORCED DUCT

(71) Applicant: Fran Lanciaux, Grand Rapids, OH (US)

(72) Inventor: Fran Lanciaux, Grand Rapids, OH (US)

( * ) Notice: Subject to any disclaimer, the term of this patent is extended or adjusted under 35 U.S.C. 154(b) by 309 days.

(21) Appl. No.: 16/847,756

(22) Filed: Apr. 14, 2020

(65) Prior Publication Data
US 2020/0326094 A1    Oct. 15, 2020

Related U.S. Application Data

(60) Provisional application No. 62/834,009, filed on Apr. 15, 2019.

(51) Int. Cl.
| | |
|---|---|
| *F16L 9/14* | (2006.01) |
| *F24F 13/02* | (2006.01) |
| *F16L 9/00* | (2006.01) |
| *F16L 9/04* | (2006.01) |

(52) U.S. Cl.
CPC .......... *F24F 13/0209* (2013.01); *F16L 9/003* (2013.01); *F16L 9/04* (2013.01); *F24F 13/0254* (2013.01)

(58) Field of Classification Search
CPC ......... F16L 9/003; F16L 9/04; F24F 13/0209; F24F 13/0254
USPC ........ 138/149, 151, 155, 158, 161, 162, 163
See application file for complete search history.

(56) References Cited

U.S. PATENT DOCUMENTS

| | | | | |
|---|---|---|---|---|
| 2,341,311 | A * | 2/1944 | Carlson | H02G 5/06 174/68.2 |
| 2,347,855 | A * | 5/1944 | Varga | F16L 59/12 425/117 |
| 2,396,030 | A * | 3/1946 | Terry | F16L 9/003 411/921 |
| 2,916,054 | A * | 12/1959 | Callan | F16L 23/14 285/364 |
| 3,331,305 | A * | 7/1967 | Oneson | F16L 41/082 138/158 |
| 3,690,243 | A * | 9/1972 | Lambert | F24F 13/0254 52/506.07 |
| 5,632,128 | A * | 5/1997 | Agar | E04B 2/7453 52/715 |
| 6,364,374 | B1 * | 4/2002 | Noone | F16L 25/0009 138/158 |
| 7,712,787 | B2 * | 5/2010 | Vincenti | F16L 9/003 403/294 |

(Continued)

*Primary Examiner* — James F Hook
(74) *Attorney, Agent, or Firm* — Ward Law Office LLC; C. Fred Charpie, III (57) ABSTRACT

A panel clip formed from a clip pre-form and configured for use with insulated, reinforced duct is provided. The panel clip includes a first plurality of gripping teeth formed in a first panel section. A second plurality of gripping teeth is formed adjacent the first plurality of gripping teeth. A first bending zone is positioned adjacent the second plurality of gripping teeth and opposite the first plurality of gripping teeth. A second bending zone is positioned spaced apart from the first bending zone and opposite the second plurality of gripping teeth. A third bending zone positioned spaced apart from the second bending zone and opposite the first bending zone. A distance formed from the first bending zone to the second bending zone is defined by a thickness of a layer of rigid insulation.

4 Claims, 7 Drawing Sheets

(56) References Cited

U.S. PATENT DOCUMENTS

| | | | |
|---|---|---|---|
| 2013/0174934 A1* | 7/2013 | Duffy | F16L 9/18 |
| | | | 138/109 |
| 2016/0131389 A1* | 5/2016 | Lanciaux | F24F 13/0254 |
| | | | 138/172 |
| 2019/0219299 A1* | 7/2019 | Lubratt | F24F 13/0281 |

* cited by examiner

INSULATED METAL CLAD REINFORCED DUCT

RELATED APPLICATIONS

This application claims the benefit of U.S. Provisional Patent Application No. 62/834,009 filed Apr. 15, 2019, the disclosure of which is incorporated herein by reference in its entirety.

BACKGROUND

Ducts comprising insulative foam panels are widely used in the heating, ventilation and air conditioning field. The ducts are configured as conduits or passages and used to deliver and remove heated or cooled air.

The insulative foam panels can be enclosed by a rigid outer layer. The rigid outer layer is configured as a protective covering for the insulative foam panels and further provide increased strength and rigidity to the duct. Non-limiting examples of rigid outer layers include sheet metal, galvanized metal, aluminum, thermoplastic materials and the like.

Various manufacturing methods of forming duct having insulative foam panels and a rigid outer layer are known and can involve bonding the insulative foam panels to the rigid outer layer. In certain instances, it is known to bond the insulative foam panels to the rigid outer layer through the use of adhesives. However, this method can be time consuming, labor intensive and can result in excess waste materials.

It would be advantageous if duct having insulative foam panels and a rigid outer layer could be manufactured more efficiently.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the insulated, metal clad, reinforced duct.

The above objects as well as other objects not specifically enumerated are achieved by a panel clip formed from a clip pre-form and configured for use with insulated, reinforced duct. The panel clip includes a first plurality of gripping teeth formed in a first panel section. A second plurality of gripping teeth is formed adjacent the first plurality of gripping teeth. A first bending zone is positioned adjacent the second plurality of gripping teeth and opposite the first plurality of gripping teeth. A second bending zone is positioned spaced apart from the first bending zone and opposite the second plurality of gripping teeth. A third bending zone positioned spaced apart from the second bending zone and opposite the first bending zone. A distance formed from the first bending zone to the second bending zone is defined by a thickness of a layer of rigid insulation.

The above objects as well as other objects not specifically enumerated are also achieved by an insulated, reinforced duct configured as a passage to facilitate the delivery and removal of heated, cooled and/or conditioned air. The insulated, reinforced duct includes an outer cladding layer forming an enclosure. The enclosure forms an interior space. A plurality of insulative panels is positioned within the interior space of the outer cladding layer and is seated against the outer cladding layer. Each of the insulative panels has a thickness. A flange rail connector radially extends from outer cladding layer. A panel clip is configured to engage an insulative panel and the flange rail connector in a manner to secure the insulative panel to the flange rail connector. The panel clip includes a plurality of bend zones and a distance between two bend zones corresponds to the thickness of the insulative panels.

The above objects as well as other objects not specifically enumerated are also achieved by a method of forming insulated, reinforced duct including the steps of forming a reinforced duct having a layer of rigid insulation positioned inside a metallic cladding layer and a flange rail connector extending outwardly from the metallic cladding layer, positioning a clip pre-form in a manner such that gripping teeth face an inside surface of the layer of rigid insulation and a first bend zone aligns with an edge of the layer of rigid insulation, engaging the layer of rigid insulation with the gripping teeth until an inner face of the clip pre-form is seated against the inside surface of the layer of rigid insulation, bending the clip pre-form along the first bending zone in a manner such that a second inside panel section of the clip pre-form is seated against a vertical outside face of the flange rail connector, bending the clip pre-form along a second bend zone until a third bending zone is positioned adjacent an end of the flange rail connector and bending the clip pre-form along the third bend zone and around the end of the flange rail connector.

Various objects and advantages of the insulated, metal clad, reinforced duct will become apparent to those skilled in the all from the following detailed description, when read in light of the accompanying drawings.

DETAILED DESCRIPTION

The insulated, metal clad, reinforced duct will now be described with occasional reference to specific embodiments. The insulated, metal clad, reinforced duct may, however, be embodied in different forms and should not be construed as limited to the embodiments set forth herein. Rather, these embodiments are provided so that this disclosure will be thorough and complete, and will fully convey the scope of the insulated, metal clad, reinforced duct to those skilled in the art.

Unless otherwise defined, all technical and scientific terms used herein have the same meaning as commonly understood by one of ordinary skill in the art to which the insulated, metal clad, reinforced duct belongs. The terminology used in the description of the insulated, metal clad, reinforced duct is for describing particular embodiments only and is not intended to be limiting of the insulated, metal clad, reinforced duct. As used in the description of the insulated, metal clad, reinforced duct and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the insulated, metal clad, reinforced duct. Notwithstanding that the numerical ranges and parameters setting forth the broad scope of the insulated, metal clad, reinforced duct are approximations, the numerical values set forth in the specific examples are reported as precisely as possible. Any numerical values, however, inherently contain certain errors necessarily resulting from error found in their respective measurements.

The description and figures disclose an insulated, metal clad, reinforced duct (hereafter "clad duct"). Generally, the clad duct includes one or more layers of rigid insulation enclosed by a rigid outer cladding layer. The one or more layers of rigid insulation are connected to the rigid outer layer with the use of one or more panel clips. The panel clips are formed from a retainer clip pre-form having a plurality of bending zones. The distance between certain bend zones is defined by the thickness of the one or more layers of rigid insulation.

Figure 1:
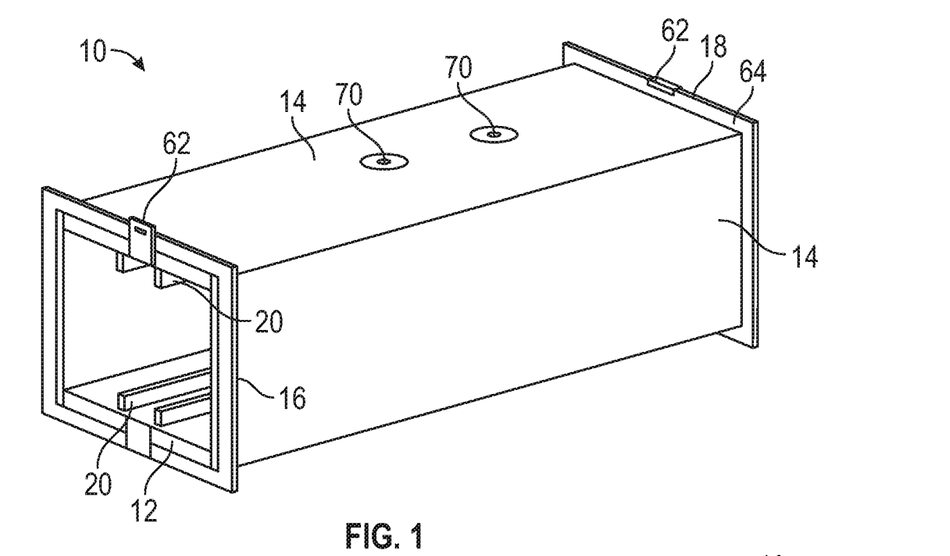
FIG. 1 is a right perspective view of a reinforced duct with insulative panels clad with a metallic layer in accordance with the invention.
Figure 2:
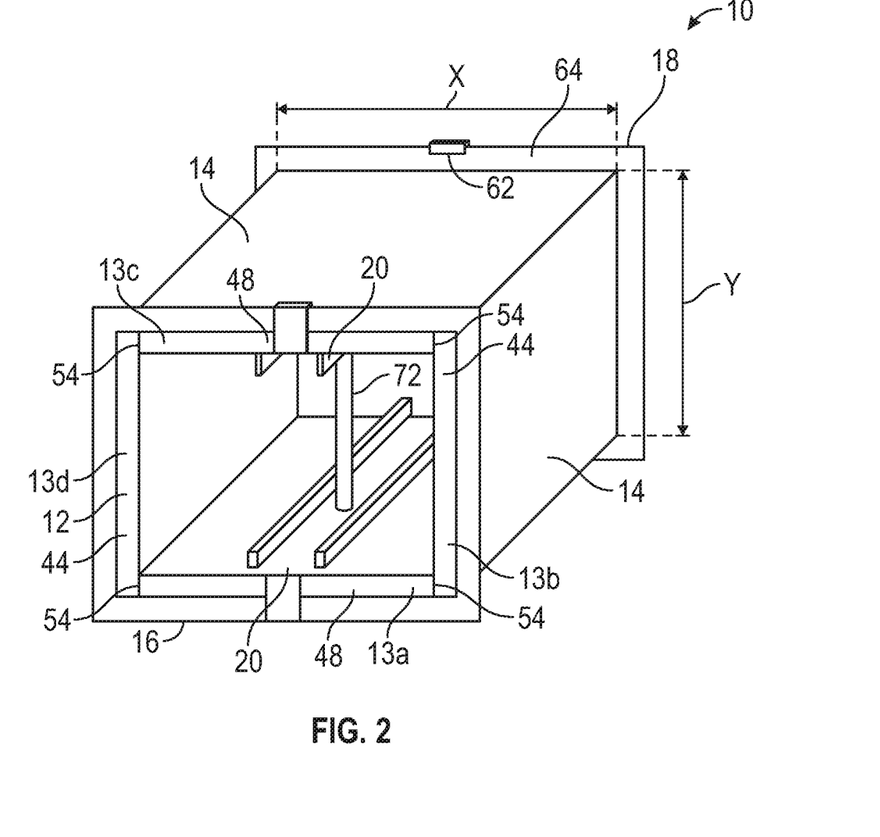
FIG. 2 is a front perspective view of the reinforced duct of FIG. 1.

Referring now to FIGS. 1 and 2, a clad duct is shown generally at 10. The clad duct 10 is configured as a passage to facilitate the delivery and removal of heated, cooled and/or conditioned air. The clad duct 10 comprises an inner layer of rigid insulation 12. The inner layer of rigid insulation 12 is arranged in four panels 13a-13d, thereby forming a rectangular cross-section shape. Each of the panels 13a-13d has an outer metallic cladding layer 11. A first flange rail connector 16 is positioned at one end of the clad duct 10 and a second flange rail connector 18 is positioned at the opposing second end of the reinforced duct 10. In certain instances, the first and second flange rail connectors 16, 18 can be formed integral with the cladding layer 14. However, such is not necessary for successful operation of the clad duct 10.

Figure 3:
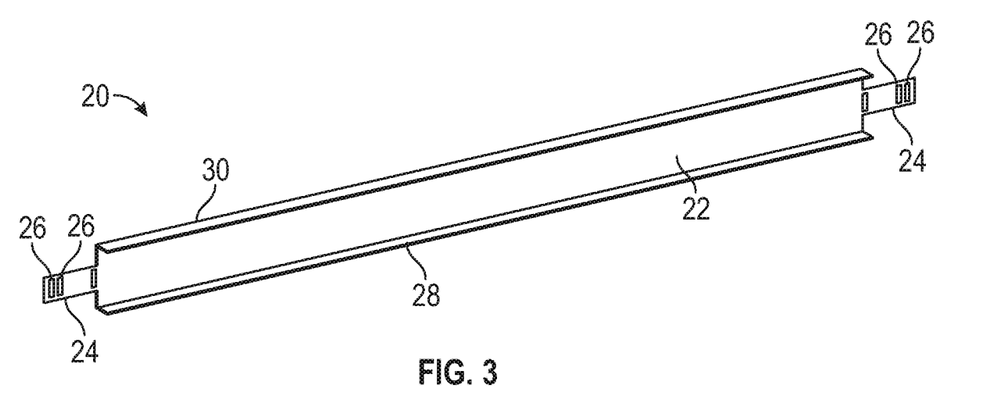
FIG. 3 is a right front perspective view of a rib of the reinforced duct of FIG. 1.
Figure 4:
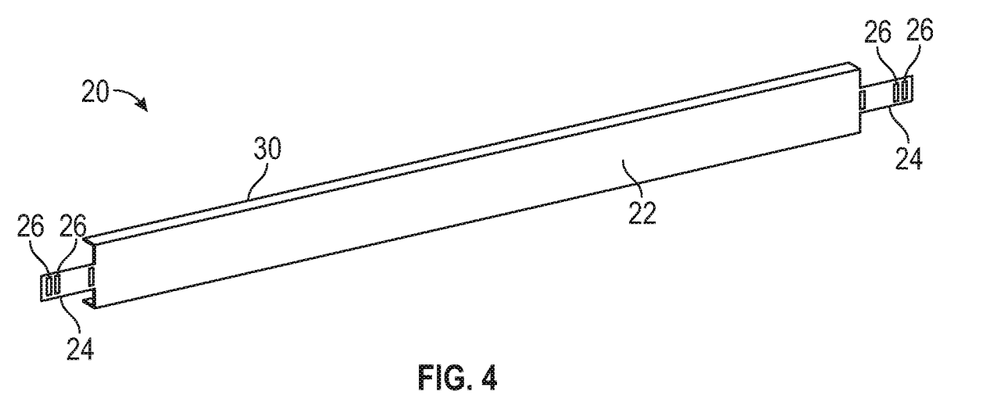
FIG. 4 is a right rear perspective view of the rib of FIG. 3.

Referring again to FIGS. 1 and 2, the clad duct 10 can include a plurality of interior ribs 20. The interior ribs 20 are shown in greater detail in FIGS. 3 and 4. The interior ribs 20 comprise a central section 22 and tabs 24 at each end. Each of the tabs 24 is arranged to extend in an axial direction from the central section 22. Each of the tabs 24 is provided with a plurality of slots indicated at 26. A first leg 28 extends in a direction perpendicular to the central section 22 and a second leg 30 extends from the central section 22 in the same direction as the first leg 28. In the illustrated embodiment, the central section 22 and the first and second legs 28, 30 combine to form a U-shaped cross-section. The U-shaped cross section is configured to provide strength and rigidity to the interior rib 20. However, it should be appreciated that in other embodiments, the interior rib 20 can have other structures, components and assemblies configured to provide strength and rigidity.

Figure 5:
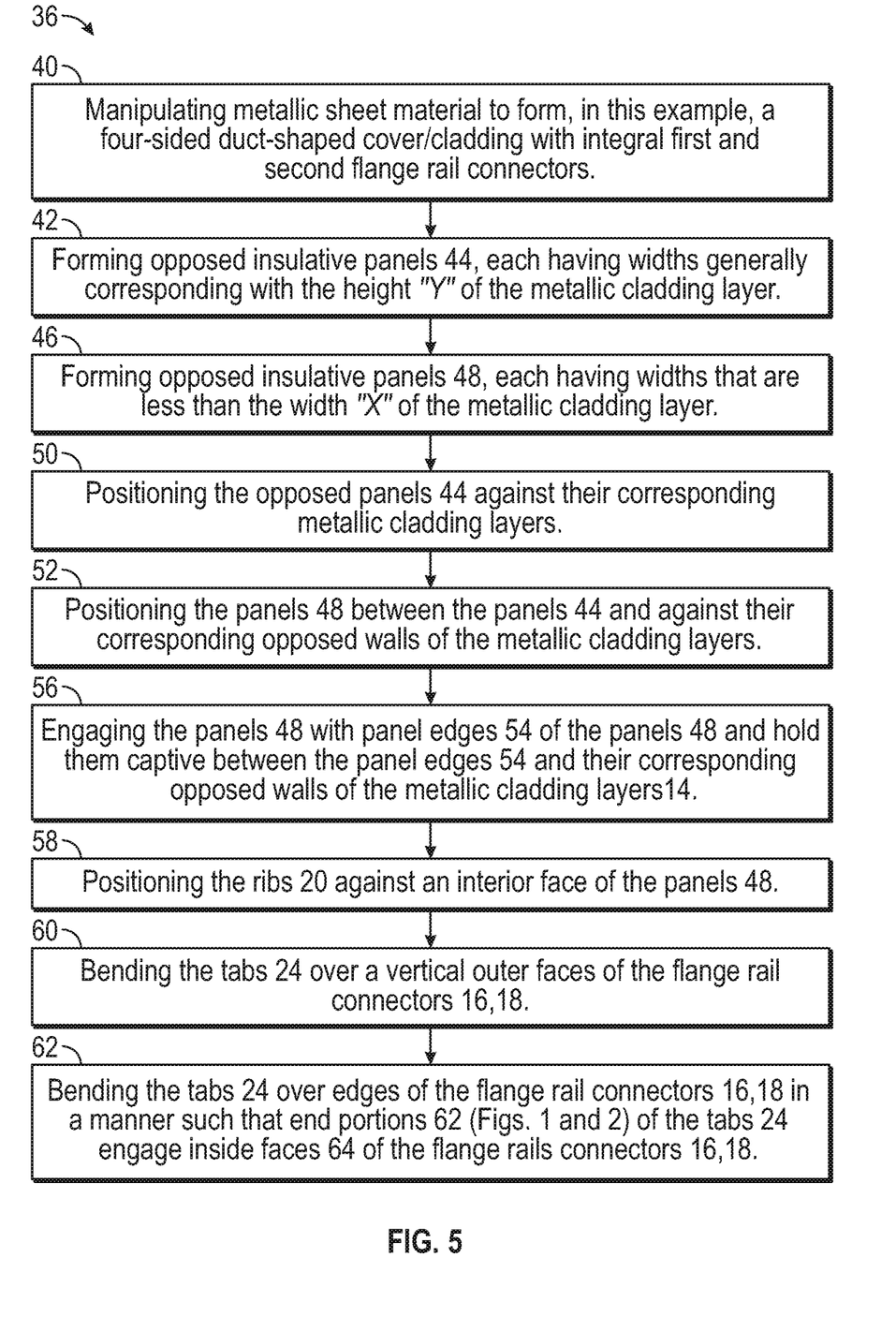
FIG. 5 is a flow chart illustrating a method of forming the reinforced duct of FIG. 1.

Referring now to FIG. 5, a method 36 for producing the clad duct 10 is illustrated. In a first step 40, metallic sheet material is manipulated to produce, in this example, a four-sided duct-shaped, metallic cladding layer 14 with integral flange rail connectors 16 and 18. Referring again to FIG. 2, metallic cladding layer has a width "X" and a height "Y." The thickness of the metallic sheet material will be treated as negligible in this description. Referring again to FIG. 5 in a next step 42, two opposed insulative panels 44 are formed, each having widths generally corresponding with the height "Y" of the metallic cladding layer 14. In a next step 46, opposing insulative panels 48 are formed, which can be seen in FIG. 2, each having widths that are less than the width "X" of the metallic cladding layer 14.

Referring again to FIG. 2, each of the opposed panels 44 are the same size and each of the opposed panels 48 are the same size. The width of each of the panels 48 is width "X" minus the thicknesses of the two opposed panels 44. Referring again to FIG. 5 in a next step 50, the opposed panels 44 may be positioned against their corresponding metallic cladding layers 14. In a next step 52, with the opposed panels 44 in place, the panels 48 are positioned between the panels 44, as shown in FIG. 2, and against their corresponding opposed walls of the metallic cladding layers 14. In a next step 56, the panel edges 54 (FIG. 2) of the panels 48 engage the panels 44 and hold them captive between the panel edges 54 and their corresponding opposed walls of the metallic cladding layers 14.

In the embodiment illustrated in FIG. 2, the clad duct 10 has a symmetrical cross-sectional shape. Accordingly, the opposing panels 44 are the same size and opposing panels 48 are the same size. However, in certain instances, this would not be the case. In one non-limiting example, such as for example in a duct transition section (not shown), each of the opposed panels 44 may be different sizes and/or each of the opposed panels 48 may be different sizes.

Referring again to FIGS. 2 and 5 in a next step 58, with the opposing panels 44 and 48 positioned as described above, the ribs 20 are positioned inside of the clad duct 10, against an interior face of the panels 48. In a next step 60, the tabs 24 are bent approximately 90 degrees over a vertical outer faces of the flange rail connectors 16, 18. This bending is facilitated by the slots 26, which are positioned in a manner such that they align with the vertical outside faces of the flange rail connectors 16, 18. Next, in step 62, the tabs 24 are bent again over the outer edges of the flange rail connectors 16, 18 in a manner such that end portions 62 (FIGS. 1 and 2) of the tabs 24 engage inside faces 64 of the flange rails connectors 16, 18. As described above, this bending of the tabs 24 is facilitated by the slots 26. The slots 26 are positioned within the tabs 24 in a manner such that the distances between the slots 26, correspond with popular thicknesses of insulative panels 44, 48.

Referring again to FIG. 1, in certain instances fasteners 70 may be used to pull the ribs 20 against the inside of the panels 48. Used in this manner, the fasteners 70 can also be used to pull the sheet metal cladding 14 against the outside of the panels 48, providing additional stiffening and integrity to the reinforced duct 10. However, it should be appreciated that use of the fasteners 70 is optional and not required for successful operation of the reinforced duct 10.

Referring again to FIG. 2, the reinforced duct 10 includes a reinforcing strut 72. The reinforcing strut 72 is positioned between the opposing ribs 20 and is configured to lock the relative position of the opposing ribs 20 in a manner such as to substantially prevent movement therebetween. While the embodiment shown in FIG. 2 illustrates a reinforcing strut 72 having the relatively simple structure of a uniform column, it should be understood that in other embodiments, the reinforcing strut 72 can incorporate other forms and structures. Non-limiting examples of suitable reinforcing strut structures are shown in U.S. Pat. No. 9,995,503, issued Jun. 12, 2018 to Lanciaux, the disclosure of which is incorporated herein by reference in its entirety.

Figure 6:
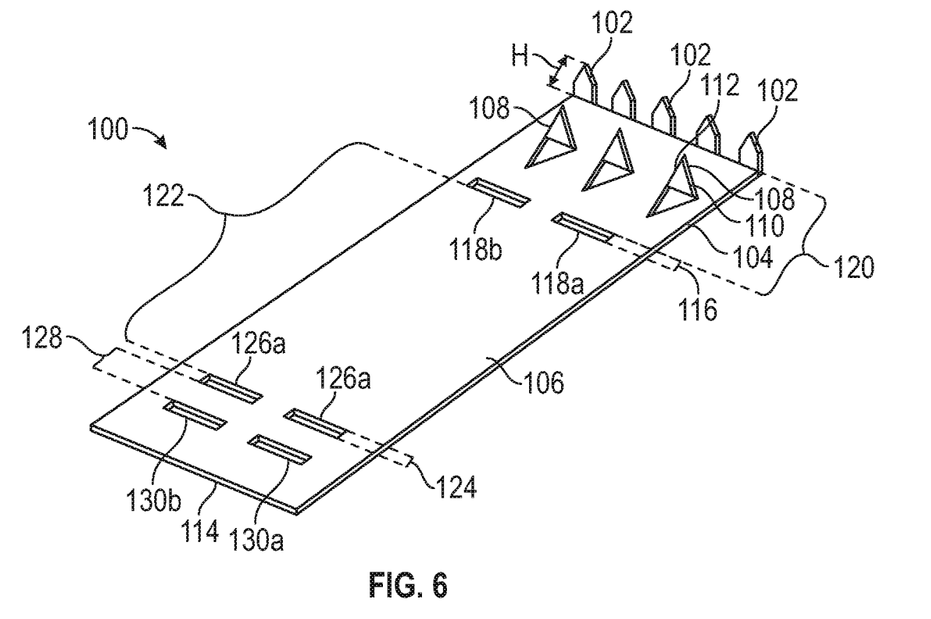
FIG. 6 is a perspective view of a first embodiment of a retainer clip pre-form in accordance with the invention.

Referring now to FIG. 6, a first embodiment of a retainer clip pre-form (hereafter "clip pre-form") in accordance with the invention is indicated generally at 100. As will be explained in more detail below, the pre-form 100 is configured to form a retainer clip (FIG. 7), with the retainer clip, in an installed position, being configured to secure the panels 44, 48 against the first or second flange rail connector 16, 18. In the illustrated embodiment, the pre-form 100 is a unitary piece, which is formed from a malleable material. A suitable non-limiting example of a malleable material is sheet metal. However, it is within the contemplation of the reinforced duct, that the clip pre-form can be formed from discrete elements assembled together and can be formed from other materials or combinations of materials suitable for the functions described herein.

Referring again to FIG. 6, the clip pre-form 100 is provided with a first plurality of gripping teeth 102, which extend from a first end 104 of the clip pre-form 100. Each of the gripping teeth 102 extends at an angle to an inner face 106 of the clip pre-form 100. In the illustrated embodiment, the gripping teeth 102 extend at an angle that is substantially perpendicular to the inner face 106. The clip pre-form 100 is also provided with a second plurality of gripping teeth 108, which are adjacent to but spaced apart from the first end 104 of the clip pre-form 100. The gripping teeth 108 are defined by a first and second edges 110, 112 that intersect at a point. The gripping teeth 108 may be produced by forming V-shaped cutout in the clip pre-form 100 and bending the gripping teeth 108 in a manner such that they extend from the inner face 106 of the clip pre-form 100. The gripping teeth 2 extend perpendicularly from the inner face 106. However, it should be appreciated that the gripping teeth 108 can be formed. In other manners and can extend from the inner face 106 at other angles, suitable for the functions described herein.

Referring again to FIG. 6, each of the gripping teeth 102, 108 has an end which is pointed and is adapted to penetrate into insulative foam panels 44, 48, such as those shown in FIGS. 1 and 2. In accordance with the invention, the quantity of gripping teeth 102, 108 on the clip pre-form 100 may be varied according to specific applications. In certain instances, it is contemplated that clip pre-form 100 can have a lone first gripping tooth 102 positioned at or adjacent to the end 104 and can also have a lone second gripping tooth 108 positioned between the lone first gripping tooth 102 and a second end 114 of the clip pre-form 100.

Referring again to FIG. 6, each of the gripping teeth 102, 108 has a height H. The height H is configured to be a distance which is less than the thickness of the insulative foam panels 44, 48 to be engaged by the teeth 102, 108. In the illustrated embodiment, the height H is in a range of from about 0.25 inches to about 0.75 inches. However, in other embodiments, the height H can be less than about 0.25 inches or more than about 0.75 inches, such that the height H is less than the thickness of the insulative foam panels 44, 48 to be engaged by the teeth 102, 108.

Referring again to FIG. 6, the clip pre-form 100 further comprises a laterally extending first bend zone 116, provided between the first and second ends 104, 114. In the embodiment illustrated in FIG. 6, the first bend zone 116 is defined by a plurality of slats 118a, 118b. The slots 118a, 118b are configured to extend laterally across the clip pre-form 100. While the embodiment shown in FIG. 6 illustrates a quantity of two slots 118a, 118b, in alternate embodiments, the first bend zone 116 may be defined by more or less than a quantity of two slats, or by other suitable structures such as the non-limiting examples of a series of apertures, an area of reduced thickness and the like. It should be appreciated that the slots 118a, 118b result in less bending force in the area of the first bend zone 116 than it takes to produce a laterally extending bend in the adjacent regions on either side of the bending zone 116. In certain instances, defining a bending zone with one or more slots or apertures provides an added advantage in that these openings in the clip pre-form 100 facilitate the positioning of clip pre-form 100 relative to an insulative foam panel 44, 48 during the installation of the clip pre-form 100. Such openings provide for viewing a portion of an insulative foam panel through the clip pre-form 100 such that an outward edge of the insulative foam panel 44, 48 is visible from the inner face 106 of the clip pre-form 100 when an opposing face (not shown) of the clip pre-form 100, is positioned adjacent to an insulative foam panel 44, 48.

Referring again to FIGS. 6 and 8, the clip pre-form 100 has a first, inside panel section, indicated at 120, which is adapted for placement against an inside surface of the insulative foam panel 44, 48. In this position, the gripping teeth 102, 108 of the clip pre-form penetrate the inside surface of the insulative foam panel 44, 48 and extend into interior portions of the insulative foam panel 44, 48. The panel section 120 extends from the first end 104 of the clip pre-form 100 to the first bend zone 116. The clip pre-form 100 has a second, inside panel section, indicated at 122, which extends from the first bend zone 116 to a second laterally extending bend zone indicated at 124. The second bend zone 124 may be defined by slots, indicated at 126a, 126b, or by holes or other bending zone defining devices as described above with reference to the first bend zone 116. The second bend zone 124 is positioned between the first bend zone 116 and the second end 114. The clip pre-form 100 includes a third laterally extending bend zone indicated at 128, which is defined by slots 130a, 130b. The slots 130a, 130b can have a configuration corresponding with the configurations of the slots 118a, 110, 126a and 126b.

Figure 7:
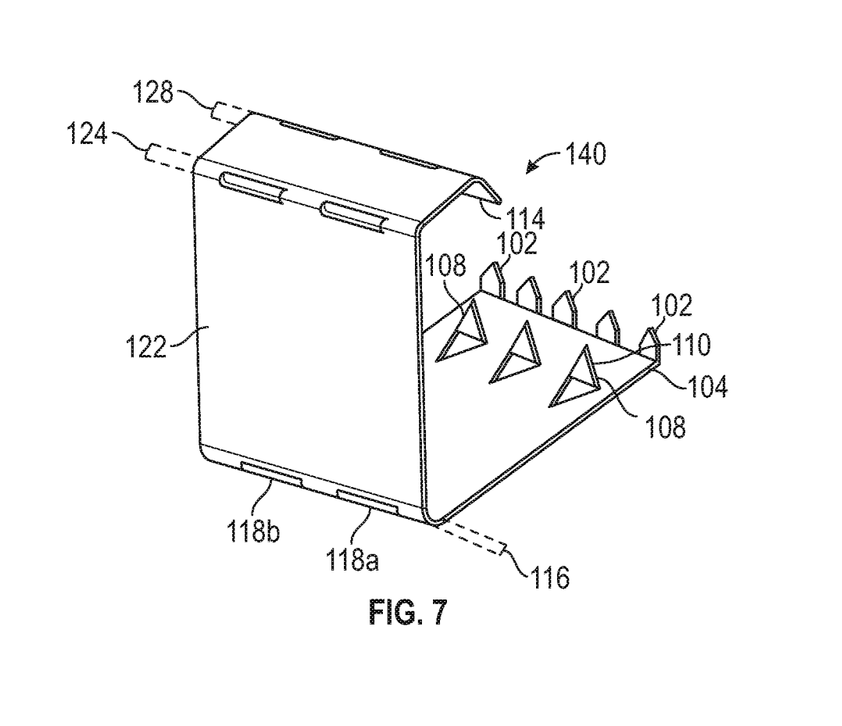
FIG. 7 is a perspective view of a first embodiment of a panel clip following formation from the retainer clip pre-form of FIG. 6.

Referring now to FIG. 7, a panel clip is indicated generally at 140. During installation, the panel clip 140 is formed from the clip pre-form 100 shown in FIG. 6 and described above.

Figure 8:
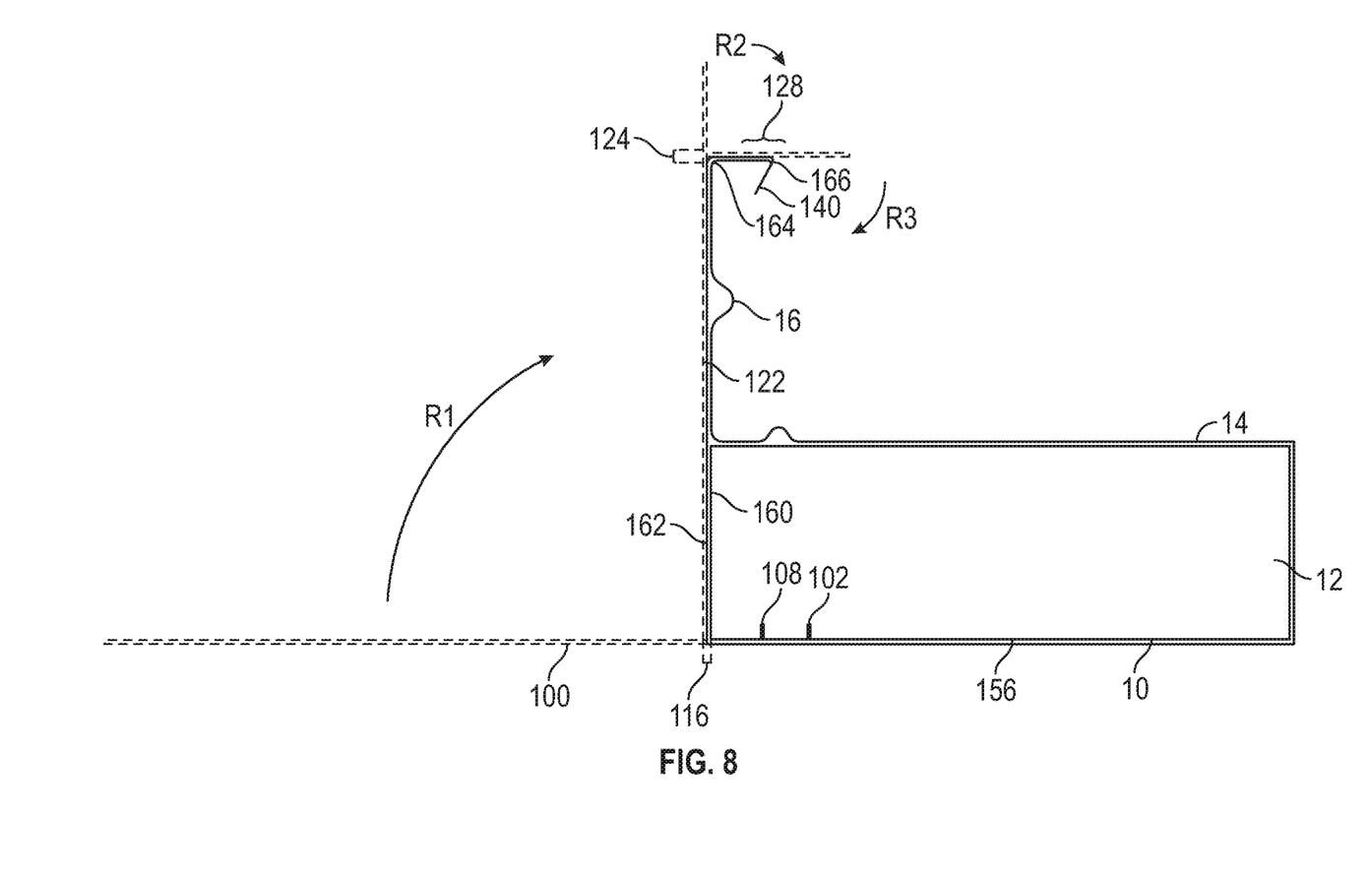
FIG. 8 is a cross-sectional side view drawing of the reinforced duct of FIG. 1 illustrating the method steps of forming the panel clip of FIG. 7.

Referring now to FIG. 8, the method of forming and installing the panel clip 140 on a reinforced duct 10 will now be described. As discussed above, the reinforced duct 10 includes a layer of rigid insulation 12 positioned inside a metallic cladding layer 14. A flange rail connector 16 extends outwardly from the metallic cladding layer 14 and may, in certain instances, be integral with the metallic cladding layer 14. The layer of rigid insulation 12, metallic cladding layer 14 and the flange rail connector 16 are assembled into the reinforced duct 10 generally in the manner described above. In a first method step, a clip pre-form 100 is positioned with the gripping teeth 102, 108 facing an inside surface 156 of the layer of rigid insulation 12 and the first bend zone 116 aligned with an edge 160 of the layer of rigid insulation 12. The slots (not shown for purposes of clarity) in the first bend zone 116 facilitate the alignment and positioning of the first bend zone 116 with the edge 160 of the layer of rigid insulation 12. The clip pre-form 100 is then connected to the layer of rigid insulation 12 by pressing the gripping teeth 102, 108 into the layer of rigid insulation 12 until the inner face 106 is seated against the inside surface 156 of the layer of rigid insulation 12. In a next step, the clip pre-form 100 is bent along the bending zone 116, as indicated by direction arrow R1, such that the second inside panel section 122 of the clip pre-form 100 is seated against a vertical outside face 162 of the flange rail connector 16. In this position, the second bend zone 124 of the clip pre-form 100 is adjacent a bend 164 in the flange rail connector 16. In a next step, the clip pre-form 100 is bent along the second bend zone 124, as indicated by direction arrow R2, until the third bending zone 128 is positioned adjacent an end 166 of the flange rail connector 16. In a final method step, the clip pre-form 100 is bent along the third bend zone 128, as indicated by direction arrow R3, and around the end 166 of the flange rail connector 16, thereby forming the panel clip 140 as shown in FIG. 7. In this manner, the installed panel clip 140 engages the layer of rigid insulation 12 and secures it against the inside surface of the metallic cladding layer 14.

The use of the panel clip 140 provides many benefits, although all benefits may not be available in all instances. First, it is contemplated that one or more panel clips 140 may be used in place, of or in combination with, a rib 20. Second, it is contemplated that one or more panel clips 140 can be used to secure the insulative foam panels 44, 48 against the adjacent portions of the metallic cladding layer 14, thereby eliminating the use of adhesives for attachment purposes.

Figure 9:
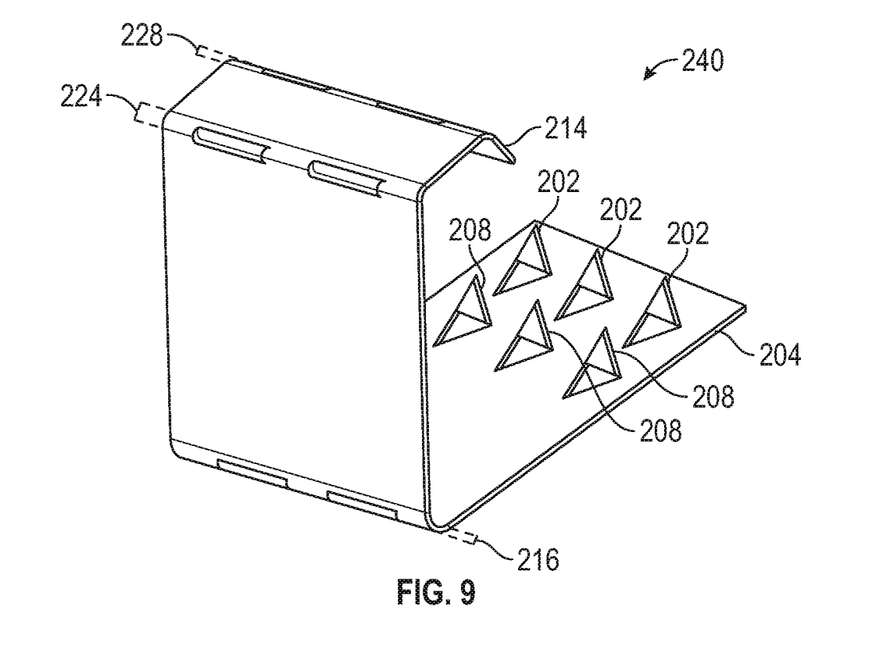
FIG. 9 is a perspective view of a second embodiment of a panel clip.

While a first embodiment of a panel clip 140 has been illustrated in FIG. 7 and described above, it should be appreciated that the panel clip can have other forms and structures. Referring now to FIG. 9, a second embodiment of a panel clip is indicated generally at 240. The panel clip 240 includes a first plurality of gripping teeth 202, a second plurality of gripping teeth 208, a first end 204, a second end 214, a first bend zone 216, a second bend zone 224 and a third bend zone 228. In the illustrated embodiment, the gripping teeth 202, first end 204, second end 214, first bend zone 216, second bend zone 224 and third bend zone 228 are the same as, or similar to, the gripping teeth 102, first end 104, second end 114, first bend zone 116, second bend zone 124 and third bend zone 128 shown in FIG. 7 and described above. The lone difference between the panel clip 240 and the panel clip 140 is the first plurality of gripping teeth 102 are replace with a plurality of gripping teeth 202 having the same structure as the gripping teeth 208. The gripping teeth 202, 208 can have the same structure and can be formed in the same manner as the gripping teeth 108, shown in FIG. 7 and described above.

Figure 10:
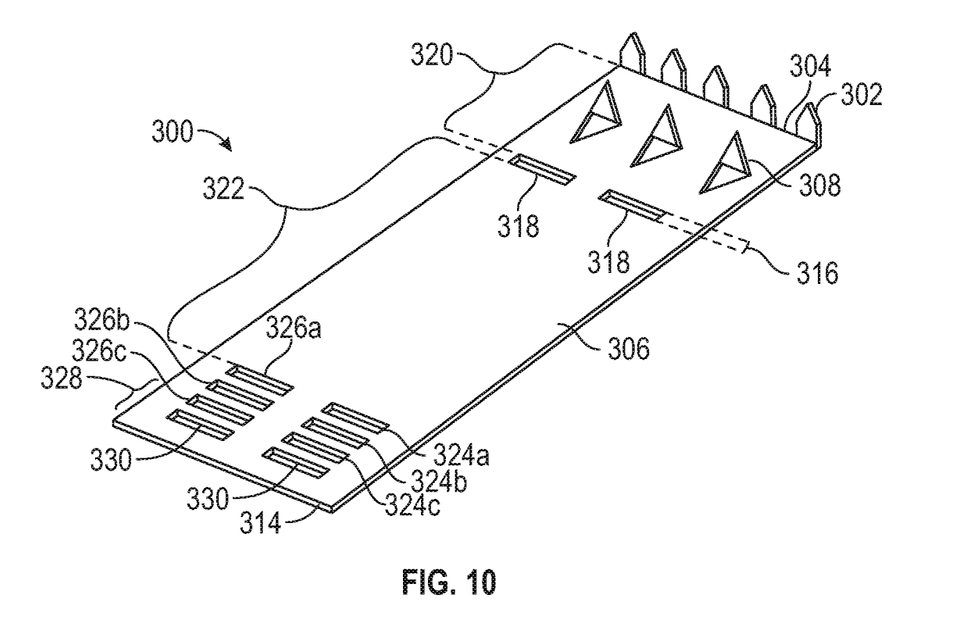
FIG. 10 is a perspective view of a second embodiment of a retainer clip pre-form in accordance with the invention.

Referring now to FIG. 10, another example of a clip pre-form is shown generally at 300. The clip pre-form 300 is a unitary piece, which may be made from sheet metal, other malleable materials or other combinations of malleable material. The clip pre-form 300 is provided with a first set of gripping teeth 302, which extend from a first end 304 of the clip pre-form 300 and extend at an angle to an inner face 306 of the clip pre-form 300. The clip pre-form 300 is also provided with a second set of gripping teeth 308, which are adjacent to but spaced from the first end 304 of the clip pre-form 300. In the illustrated embodiment, the first and second set of gripping teeth 302, 308 are the same as, or similar to, the first and second set of gripping teeth 102, 108 shown in FIG. 6 and described above. However, in other embodiments, the first and second set of gripping teeth 302, 308 can be different from the first and second set of gripping teeth 102, 108.

The clip pre-form 300 further comprises a laterally extending first bending zone 316 provided between first and second ends, 304 and 314, of the clip pre-form 300. The first bending zone 316 may be defined by slots, indicated at 318, or by holes or other bending zone defining devices as described above. In the illustrated embodiment, the first bending zone 316 is the same as, or similar to, the first bending zone 116 shown in FIG. 6 and described above. However, in other embodiments, the first bending zone 316 can be different from the first bending zone 116. The clip pre-form 300 has a first, inside panel section, indicated at 320, which is adapted to be placed against the inside of a foam panel (see FIG. 8) with the gripping teeth 302, 308 extending towards and into the inside surface of the insulative foam panel. The panel section 320 extends from the first end 304 of the clip pre-form 300 to the first bending zone 316. The clip pre-form 300 has a second, end panel section, indicated at 322, which extends from the first bending zone 316 to a plurality of second laterally extending bending zones indicated at 324a-324c. Each of the second bending zones 324a-324c may be defined by slots, indicated at 326a-326c, or by holes or other bending zone defining devices as described above. In the illustrated embodiment, each of the second bending zones 324a-324c is the same as, or similar to, the second bending zone 124 shown in FIG. 6 and described above. However, in other embodiments, each of the second bending zones 324a-324c can be different from the second bending zone 124.

Referring again to FIG. 10, the clip pre-form 300 may include a third laterally extending bending zone indicated at 328, which can have a configuration corresponding with the configurations of the bending zones 316 and 324a-324c. The third bending zone 328 may be defined by slots, indicated at 330, or by holes or other bending zone defining devices as described above. In the illustrated embodiment, the third bending zone 328 is the same as, or similar to, the third bending zone 128 shown in FIG. 6 and described above. However, in other embodiments, the third bending zone 328 can be different from the third bending zone 128. The plurality of second bending zones 324a-324c are positioned between the first bending zone 316 and the third bending zone 328. Advantageously and as will be explained in more detail below, the plurality of second bending zones 324a-324c allow the clip pre-form 300 to be used in scenarios where the insulative foam panels have different thicknesses.

Figure 11A:
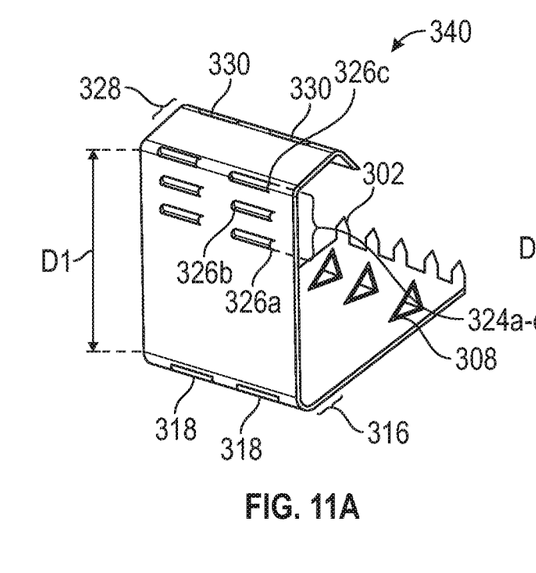
FIG. 11A is a perspective view of a third embodiment of a panel clip following formation from the retainer clip pre-form of FIG. 10 illustrating use with layer of rigid insulation having a first thickness.

Referring now to FIG. 11A, a panel clip which has been formed from the clip pre-form 300 is indicated generally at 340. The panel clip 340 includes the first and second sets of teeth 302, 308, the first bend zone 316 formed about the slots 318, the plurality of second bend zones 324a-324c and the third bend zone 328 formed about the slots 330. The clip 340 is installed as discussed above, generally, with reference to FIG. 8. In the embodiment shown in FIG. 11A, the second bend zone 324c is formed about the slots 326c. Advantageously, by forming the second bend zone 324c about the slots 326c, a distance D1 is formed between the first bend zone 316 and the second bend zone 324c is maximized, thereby allowing use of the clip 340 with an insulative foam panel having a large thickness.

Figure 11B:
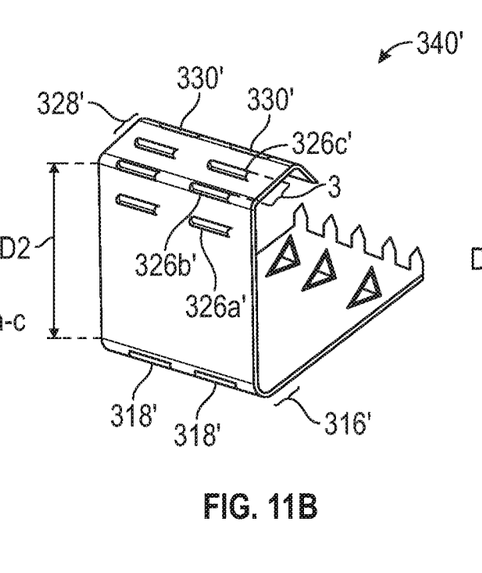
FIG. 11B is a perspective view of a third embodiment of a panel clip following formation from the retainer clip pre-form of FIG. 10 illustrating use with layer of rigid insulation having a second thickness.

Referring now to FIG. 11B, a clip which has been formed from the clip pre-form 300 is indicated generally at 340'. The clip 340' is the same as the clip 340 shown in FIG. 11A with the exception that the second bend zone 324b' is formed about the slots 326b'. Advantageously, by forming the second bend zone 324b' about the slots 326b', a distance D2 formed between the first bend zone 316' and the second bend zone 324b'. The distance D2 for the clip 240' is less than the distance D3 for the clip 240, thereby facilitating use of the clip 340' with an insulative foam panel having a thickness that is less than that requiring use of the clip 340.

Figure 11C:
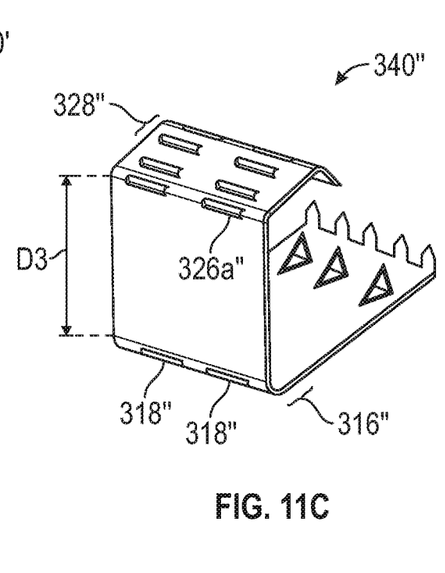
FIG. 11C is a perspective view of a third embodiment of a panel clip following formation from the retainer clip pre-form of FIG. 10 illustrating use with layer of rigid insulation having a third thickness.

Referring now to FIG. 11C, a clip that has been formed from the clip pre-form 300 is indicated generally at 340". The clip 340" is the same as the clip 340' shown in FIG. 11B with the exception that the second bend zone is formed about the slots 226a". Advantageously, by forming the second bend zone about the slots 226a", a distance D3 formed between the first bend zone 316" and the second bend zone 324c". The distance D3 for the clip 340" is less than the distance D2 for the clip 340', thereby facilitating use of the clip 240" with an insulative foam panel having a thickness that is less than that requiring use of the clip 240'.

Referring again to FIGS. 10 and 11Aa-11C, advantageously, the clip pre-form 300 having the plurality of second bend zones 324a-324c can be used with insulative foam panels having different thicknesses.

In accordance with the provisions of the patent statutes, the principle and mode of operation of the insulated, metal clad, reinforced duct have been explained and illustrated in certain embodiments. However, it must be understood that the insulated, metal clad, reinforced duct may be practiced otherwise than as specifically explained and illustrated without departing from its spirit or scope.

What is claimed is:

1. A method of forming insulated, reinforced duct comprising the steps of:
   forming a reinforced duct having a layer of rigid insulation positioned inside a metallic cladding layer and a flange rail connector extending outwardly from the metallic cladding layer;
   positioning a clip pre-form in a manner such that gripping teeth face an inside surface of the layer of rigid insulation and a first bend zone aligns with an edge of the layer of rigid insulation;
   engaging the layer of rigid insulation with the gripping teeth until an inner face of the clip pre-form is seated against the inside surface of the layer of rigid insulation;
   bending the clip pre-form along the first bending zone in a manner such that a second inside panel section of the clip pre-form is seated against a vertical outside face of the flange rail connector;
   bending the clip pre-form along a second bend zone until a third bending zone is positioned adjacent an end of the flange rail connector; and
   bending the clip pre-form along the third bend zone and around the end of the flange rail connector.

2. The method of claim 1, including step of forming the flange rail connector integral with the metallic cladding layer.

3. The method of claim 1, including the step of aligning the first bend zone with the edge using a plurality of slots in the clip pre-form.

4. The method of claim 1, wherein with the second inside panel section of the clip pre-form seated against a vertical outside face of the flange rail connector, a second bend zone of the clip pre-form is adjacent a bend in the flange rail connector.

* * * * *